United States Patent
Lin

(10) Patent No.: US 8,018,742 B2
(45) Date of Patent: Sep. 13, 2011

(54) FULL-RANGE-DUTY PWM SIGNAL GENERATION METHOD, APPARATUS, AND SYSTEM USING SAME

(75) Inventor: Ko-Ming Lin, Tainan (TW)

(73) Assignee: Grenergy Opto, Inc., Hsin-Chu (TW)

( * ) Notice: Subject to any disclaimer, the term of this patent is extended or adjusted under 35 U.S.C. 154(b) by 479 days.

(21) Appl. No.: 12/365,202

(22) Filed: Feb. 4, 2009

(65) Prior Publication Data

US 2010/0195354 A1 Aug. 5, 2010

(51) Int. Cl.
*H02M 3/335* (2006.01)
(52) U.S. Cl. ............... 363/21.01; 363/20; 363/21.12; 363/21.17; 363/21.18
(58) Field of Classification Search ............ 363/20, 363/21.01, 21.12, 21.17, 21.18
See application file for complete search history.

(56) References Cited

U.S. PATENT DOCUMENTS

| 7,705,579 B1* | 4/2010 | Hariman et al. ............ 323/284 |
| 7,876,080 B2* | 1/2011 | Dwarakanath et al. ....... 323/284 |
| 2007/0040517 A1* | 2/2007 | Yu ................................ 315/291 |
| 2008/0211471 A1* | 9/2008 | Liao et al. .................... 323/282 |
| 2009/0167267 A1* | 7/2009 | Dwarakanath et al. ....... 323/282 |

* cited by examiner

*Primary Examiner* — Bao Q Vu
(74) *Attorney, Agent, or Firm* — Ming Chow; Sinorica, LLC

(57) ABSTRACT

The present invention discloses a full-range-duty PWM signal generation method for an AC-to-DC power conversion, comprising the steps of: generating a saw-tooth signal with a predetermined valley voltage; generating a reference signal according to at least one of a current feedback signal and a voltage feedback signal; and generating a PWM signal according to voltage comparison of the saw-tooth signal and the reference signal. Furthermore, the present invention also provides a full-range-duty PWM signal generation apparatus for an AC-to-DC power conversion, and a system using the full-range-duty PWM signal generation apparatus.

16 Claims, 5 Drawing Sheets

FULL-RANGE-DUTY PWM SIGNAL GENERATION METHOD, APPARATUS, AND SYSTEM USING SAME

BACKGROUND OF THE INVENTION

1. Field of the Invention

The present invention relates to AC-to-DC power conversion, and more particularly to AC-to-DC power conversion with power saving mode.

2. Description of the Related Art

In supplying the power for electronic equipments, such as desk-top computers or notebook computers, the AC-to-DC power adapter is widely adopted. Due to the green-mode requirement or power saving demand that has become a trend, the AC-to-DC power adapter should possess power-down function when the electronic equipment enters a power saving mode.

FIG. 1 shows the architecture of a typical AC-to-DC power adapter. As shown in FIG. 1, the architecture realizing a fly-back type AC-to-DC power converter, at least includes: a PWM controller 100, an input rectifier and filter 101, a main transformer 102, an output rectifier and filter 103, a feedback network 104, and an NMOS transistor 105.

In the architecture, the PWM controller 100 is used for generating a PWM signal $V_{out}$ with a duty cycle in response to a feedback signal $V_{FB}$ and a current sensing voltage $V_S$.

The input rectifier and filter 101 is used for generating a first DC voltage according to an AC input power source.

The main transformer 102 and the output rectifier and filter 103 are used to transfer the first DC voltage to a DC output voltage $V_O$.

The feedback network 104 is used to generate the feedback signal $V_{FB}$ according to the DC output voltage $V_O$.

The NMOS transistor 105 is used to control the power transformation through the main transformer 102 in response to the PWM signal $V_{out}$.

Through a periodic on-and-off switching of the NMOS transistor 105, which is driven by the PWM signal $V_{out}$ generated from the PWM controller 100, the input power is transformed through the main transformer 102 to the output.

In the AC-to-DC power adapter illustrated above, if the PWM controller 100 is implemented with a typical prior art architecture, the duty cycle of the PWM signal $V_{out}$ is generated in the way that the end of the duty cycle is determined when the current sensing voltage $V_S$ reaches an output error signal which is derived from the feedback signal $V_{FB}$ and not shown in FIG. 1. In addition, since the output error signal has a minimum DC bias, the duty cycle of the PWM signal $V_{out}$ therefore can never be reduced to zero. As a result, if the AC-to-DC power adapter is to be powered down, some additional circuits including additional load sensing circuit and additional switch circuit have to be put in to cut off the power conversion.

One solution that conventional AC-to-DC power adapters utilize to realize the power-down function is: power down the adapter in response to a control signal from the electronic equipments. If the electronic equipment enters a power saving mode, the control signal then drives an additional switch circuit designed for cutting off the power conduction path in the AC-to-DC power adapter. However, there are some drawbacks corresponding to this solution. First, the additional switch circuit utilizing a relay or a power MOSFET for cutting off the power conduction path will increase production cost. Second, the additional switch circuit may result in worsen EMI problem. Third, the additional switch circuit may decrease the conversion efficiency. Fourth, the additional switch circuit may increase the heat production.

Another solution that conventional AC-to-DC power adapters utilize to realize the power-down function is: power down the adapter in response to a control signal from an additional load sensing circuit designed for cutting off the power conduction path in the AC-to-DC power adapter. If the electronic equipment enters a power saving mode, the power consumption of the electronic equipment then reduces dramatically so that the additional load sensing circuit of the AC-to-DC power adapter will send the control signal to drive an additional switch circuit designed for cutting off the power conduction path in the AC-to-DC power adapter. However, there are also some drawbacks corresponding to this solution. First, the circuit topology will become much more complex due to the extra implementation of load sensing circuit and switch circuit in the AC-to-DC power adapter. Second, the additional switch circuit may cause the same problems as mentioned in the previous paragraph.

Therefore, there is a need to provide a power-down solution for the AC-to-DC power adapter that is concise in circuit topology, efficient, and cost effective.

Seeing this bottleneck, the present invention proposes a solution of novel topology for generating a full-range-duty PWM signal capable of providing zero duty cycle to accomplish the power-down function without the need of any additional control signal, additional load sensing circuit or any additional switch circuit.

SUMMARY OF THE INVENTION

The primary objective of the present invention is to provide a full-range-duty PWM signal generation method for an AC-to-DC power conversion so that when the electronic equipment enters power saving mode, the PWM signal can automatically issue a zero duty cycle without the need of any additional control signal, additional load sensing circuit or any additional switch circuit.

Another objective of the present invention is to further provide a full-range-duty PWM signal generation apparatus for an AC-to-DC power conversion so that when the electronic equipment enters power saving mode, the full-range-duty PWM signal generation apparatus can automatically produce a PWM signal of zero duty cycle without the need of any additional control signal, additional load sensing circuit or any additional switch circuit.

Still another objective of the present invention is to further provide a system using a full-range-duty PWM signal generation apparatus for an AC-to-DC power conversion so that when the electronic equipment enters power saving mode, the full-range-duty PWM signal generation apparatus can automatically produce a PWM signal of zero duty cycle without the need of any additional control signal, additional load sensing circuit or any additional switch circuit.

To achieve the foregoing objectives of the present invention, a full-range-duty PWM signal generation method for an AC-to-DC power conversion is proposed, the method comprising the steps of: generating a saw-tooth signal with a predetermined valley voltage; generating a reference signal according to at least one of a current feedback signal and a voltage feedback signal; and generating a PWM signal according to voltage comparison of the saw-tooth signal and the reference signal.

To achieve the foregoing objectives, the present invention further provides a full-range-duty PWM signal generation apparatus for an AC-to-DC power conversion, comprising: a saw-tooth signal generator for generating a saw-tooth signal with a predetermined valley voltage; a combination circuit for generating a reference signal according to at least one of a current feedback signal and a voltage feedback signal; and a pulse circuit for generating a PWM signal according to voltage comparison of the saw-tooth signal and the reference signal.

To achieve the aforesaid objectives, the present invention further provides a system using a full-range-duty PWM signal generation apparatus for an AC-to-DC power conversion, comprising: a power conversion unit, responsive to a PWM signal to provide the power conduction path from an AC power source to a DC power output; a saw-tooth signal generator for generating a saw-tooth signal with a predetermined valley voltage; a combination circuit for generating a reference signal according to at least one of a current feedback signal and a voltage feedback signal; and a pulse circuit for generating the PWM signal according to voltage comparison of the saw-tooth signal and the reference signal.

To make it easier for our examiner to understand the objective of the invention, its structure, innovative features, and performance, we use a preferred embodiment together with the accompanying drawings for the detailed description of the invention.

DETAILED DESCRIPTION OF THE PREFERRED EMBODIMENTS

The present invention will be described in more detail hereinafter with reference to the accompanying drawings that show the preferred embodiment of the invention.

Figure 2:
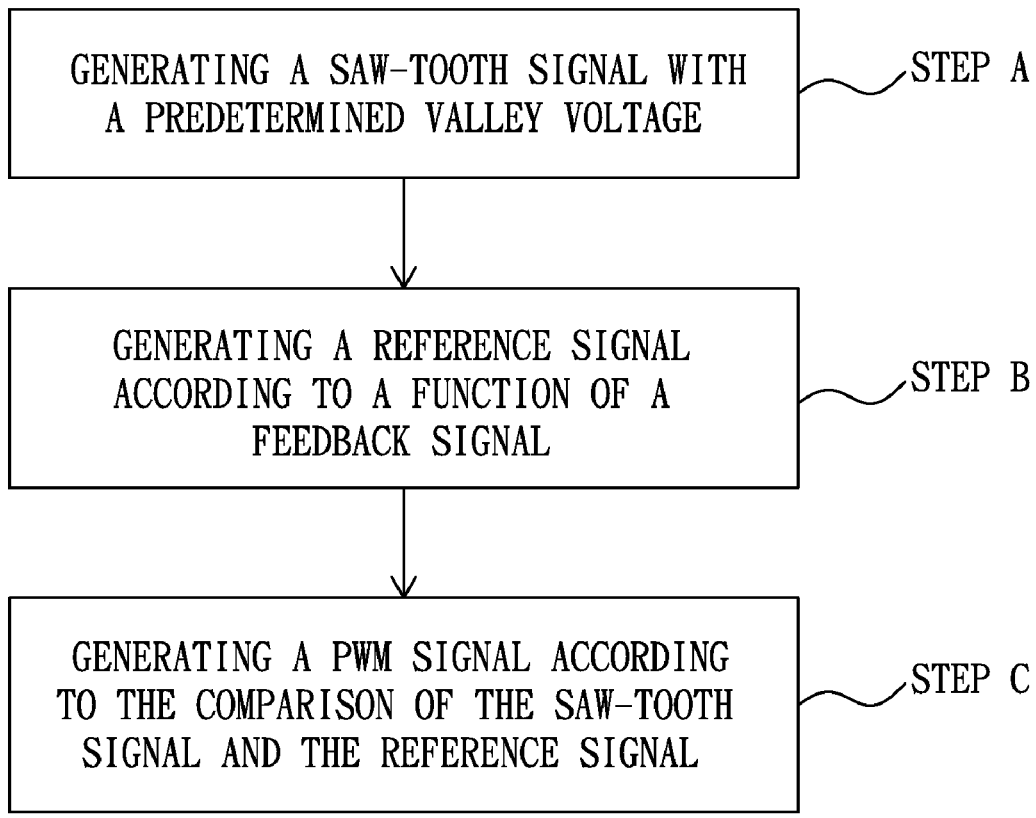
FIG. 2 is the flow chart of a full-range-duty PWM signal generation method for an AC-to-DC power conversion according to a preferred embodiment of the present invention.

Please refer to FIG. 2, which shows the flow chart of a full-range-duty PWM signal generation method for an AC-to-DC power conversion according to a preferred embodiment of the present invention. As shown in FIG. 2, the full-range-duty PWM signal generation method includes the steps of: generating a saw-tooth signal with a predetermined valley voltage (step A); generating a reference signal according to at least one of a current feedback signal and a voltage feedback signal (step B); and generating a PWM signal according to the comparison of the saw-tooth signal and the reference signal (step C).

In step A, the saw-tooth signal is generated across a capacitor by connecting the capacitor with an adaptive current source and a switching pull-low circuit.

The adaptive current source is generated according to a conversion function of a main power input voltage. The main power input voltage derived from the AC power may have different values, for example but not limited to 90V or 264V. The conversion function can be a constant, a first order polynomial, or a second order polynomial.

The switching pull-low circuit periodically pulls the saw-tooth signal to the valley voltage in response to a clock signal. The valley voltage is set by a voltage regulation, for example but not limited to 0.7V. The clock signal may have a mode selected from the group consisting of constant turn-on mode, constant turn-off mode, fixed-frequency mode, and free-running mode.

In step B, the reference signal is generated according to a function of a feedback signal, and the feedback signal may be a combination of a voltage feedback signal and a current sensing signal.

In step C, if the loading condition is normal so that the voltage of the reference signal is greater than the valley voltage, the PWM signal will have normal duty cycle to convert the power from main power input voltage to the DC output; if the loading condition is in light load or empty load so that the voltage of the reference signal is smaller than the valley voltage, the PWM signal will have zero duty cycle, and the power conversion is cut off.

Figure 3:
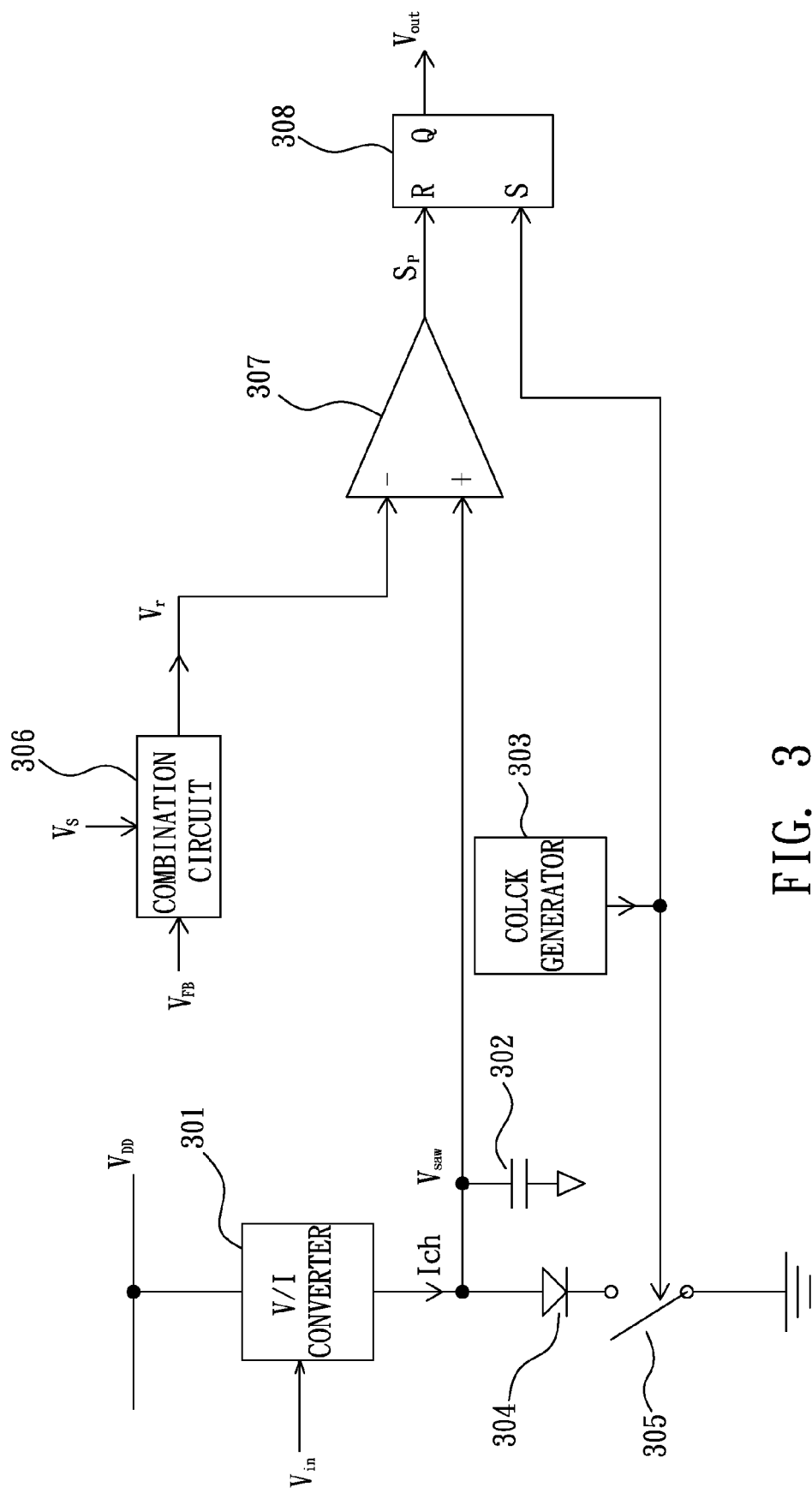
FIG. 3 is a block diagram of a full-range-duty PWM signal generation apparatus for an AC-to-DC power conversion according to a preferred embodiment of the present invention.

Please refer to FIG. 3, which shows a block diagram of a full-range-duty PWM signal generation apparatus for an AC-to-DC power conversion according to a preferred embodiment of the present invention. As shown in FIG. 3, the full-range-duty PWM signal generation apparatus for an AC-to-DC power conversion comprises a V/I converter 301, a capacitor 302, a clock generator 303, a diode 304, a switch 305, a combination circuit 306, a comparator 307, and a latch 308.

The V/I converter 301 is used to generate a current $I_{ch}$ for ramping up the voltage of the capacitor 302 according to a function of a main power input voltage $V_{in}$. The main power input voltage $V_{in}$ derived from the AC power may have different values, for example but not limited to 90V or 264V. The conversion function can be a constant, a first order polynomial, or a second order polynomial.

The capacitor 302 is used to exhibit the saw-tooth signal $V_{saw}$ with a predetermined valley voltage by the current $I_{ch}$ from the V/I converter 301 and a pull-low path consisting of the diode 304 and the switch 305. The diode 304 is periodically connected to ground via the switch 305 responsive to a clock generated from the clock generator 303.

The clock generator 303 is used to generate the clock for driving the switch 305 and the latch 308. The rising edge or falling edge of the clock defines the beginning of a switching cycle.

The combination of the diode 304 and the switch 305 is used to provide the predetermined valley voltage. In this case, the predetermined valley voltage is about 0.7V.

The combination circuit 306 is used to generate a reference voltage $V_r$ according to a combination of a feedback voltage $V_{FB}$ and a current sensing voltage $V_S$.

The comparator 307 is used to generate a pulse signal $S_P$ according to the reference voltage $V_r$ and the saw-tooth signal $V_{saw}$. If the loading condition is normal so that the voltage of the reference voltage $V_r$ is greater than the predetermined valley voltage of the saw-tooth signal $V_{saw}$, the pulse signal $S_P$ will alternatively reset the latch 308 to make the output voltage $V_{out}$ exhibit a normal duty cycle, to convert the power from the main power input voltage $V_{in}$ to the DC output. If the loading condition is in light load or empty load so that the voltage of the reference voltage $V_r$ is smaller than the predetermined valley voltage of the saw-tooth signal $V_{saw}$, the pulse signal $S_P$ will be always at high level. This will reset the latch 308 to make the output voltage $V_{out}$ exhibit zero duty cycle, and the power conversion is therefore cut off.

The latch 308 is used to generate the output voltage $V_{out}$ according to the clock signal and the pulse signal $S_P$. The beginning of a duty cycle is defined by the setting of the latch 308, and the end is determined by the resetting of the latch 308.

Figure 4:
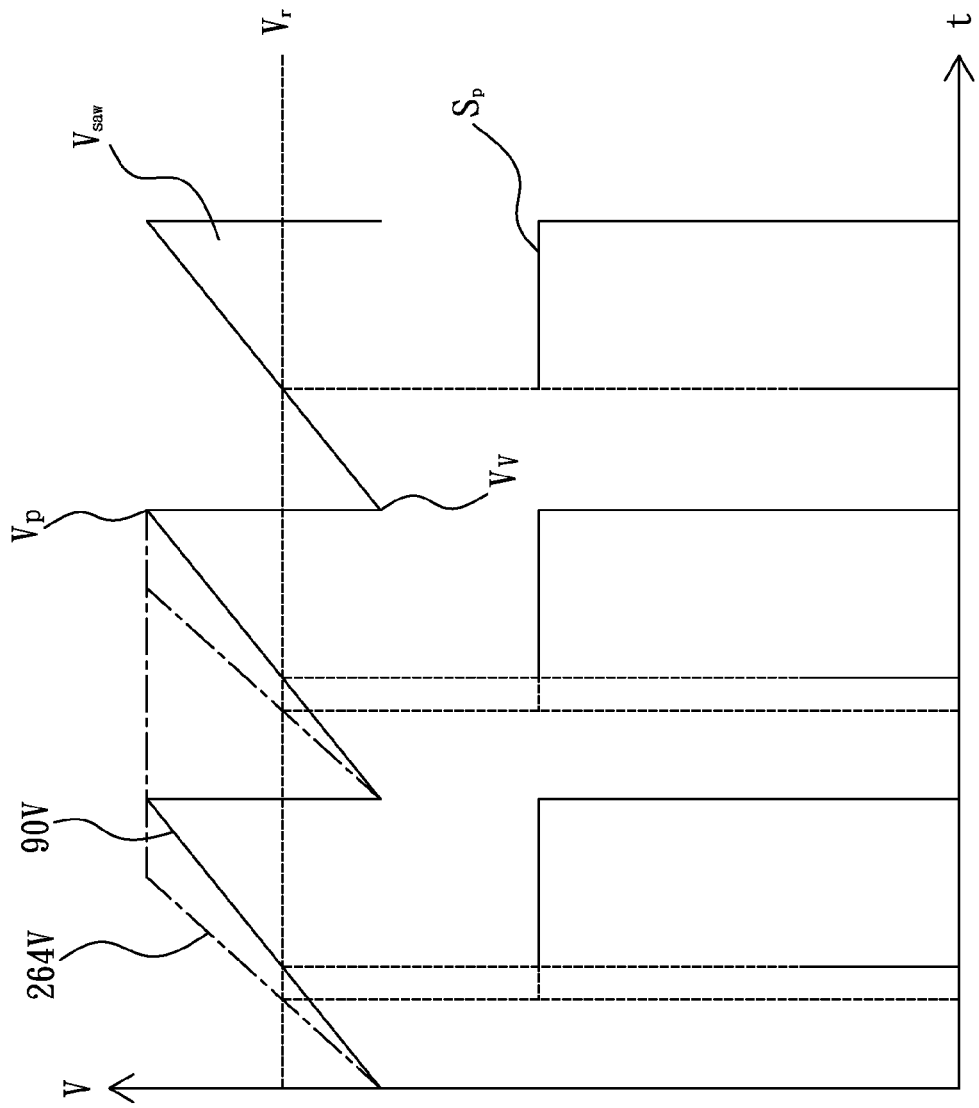
FIG. 4 is a waveform diagram of an AC-to-DC power adapter in normal loading according to a preferred embodiment of the present invention.

The corresponding waveform of the saw-tooth signal $V_{saw}$, the reference voltage $V_r$, and the pulse signal $S_P$ in the normal loading condition is illustrated in FIG. 4. As shown in FIG. 4, the pulse signal $S_P$ corresponding to a normal duty cycle is generated according to the voltage comparison of the saw-tooth signal $V_{saw}$ which has a valley voltage $V_V$ and a peak voltage $V_P$, and the reference voltage $V_r$. The rising slope of the saw-tooth signal $V_{saw}$ is variable according to the main power input voltage $V_{in}$ to adaptively convert power from the main power input voltage $V_{in}$ to the DC output.

Figure 5:
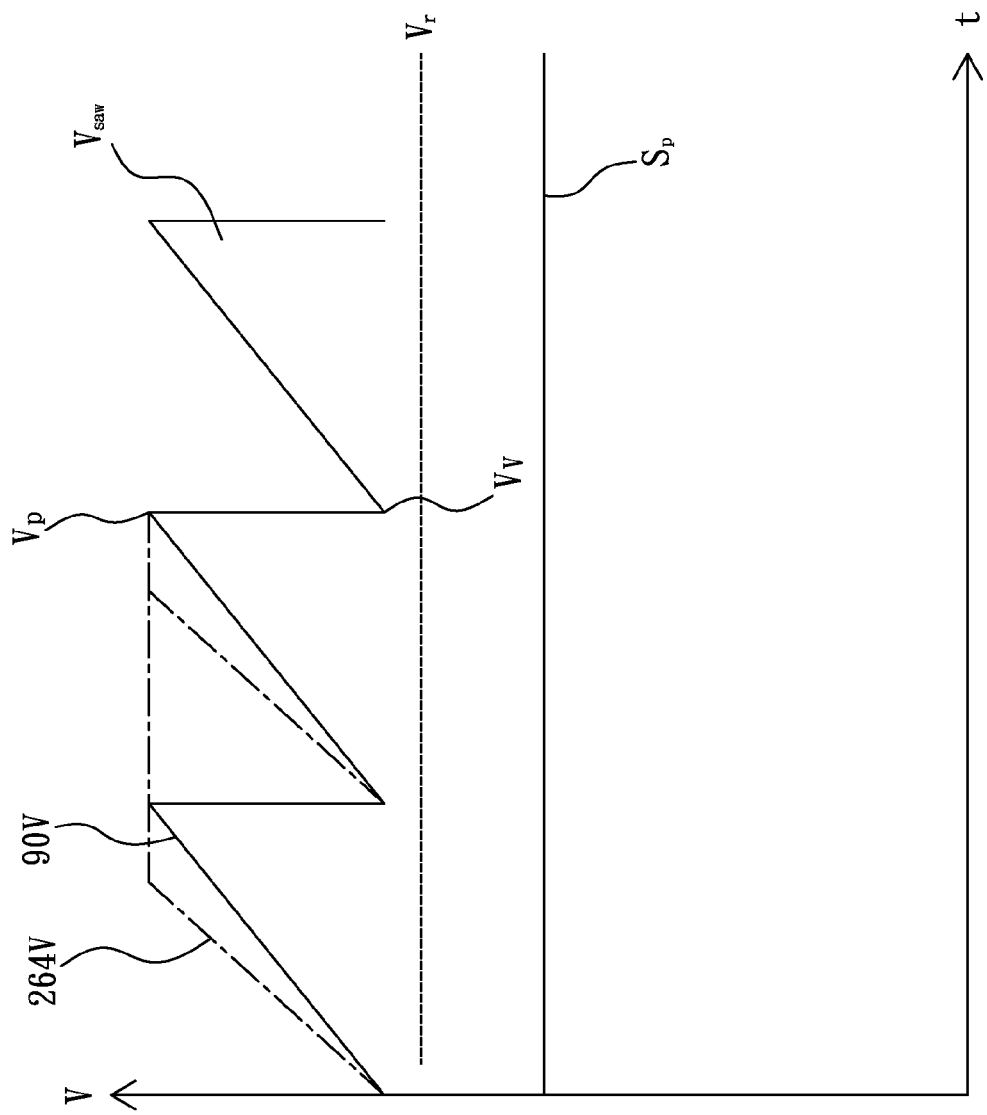
FIG. 5 is a waveform diagram of an AC-to-DC power adapter in light loading or empty according to a preferred embodiment of the present invention.

FIG. 5 shows the corresponding waveform of the saw-tooth signal $V_{saw}$, the reference voltage $V_r$, and the pulse signal $S_P$ in the light loading or empty loading condition. As illustrated in FIG. 5, the pulse signal $S_P$ corresponding to zero duty cycle is at high level according to the voltage comparison of the saw-tooth signal $V_{saw}$ and the reference voltage $V_r$.

Figure 1:
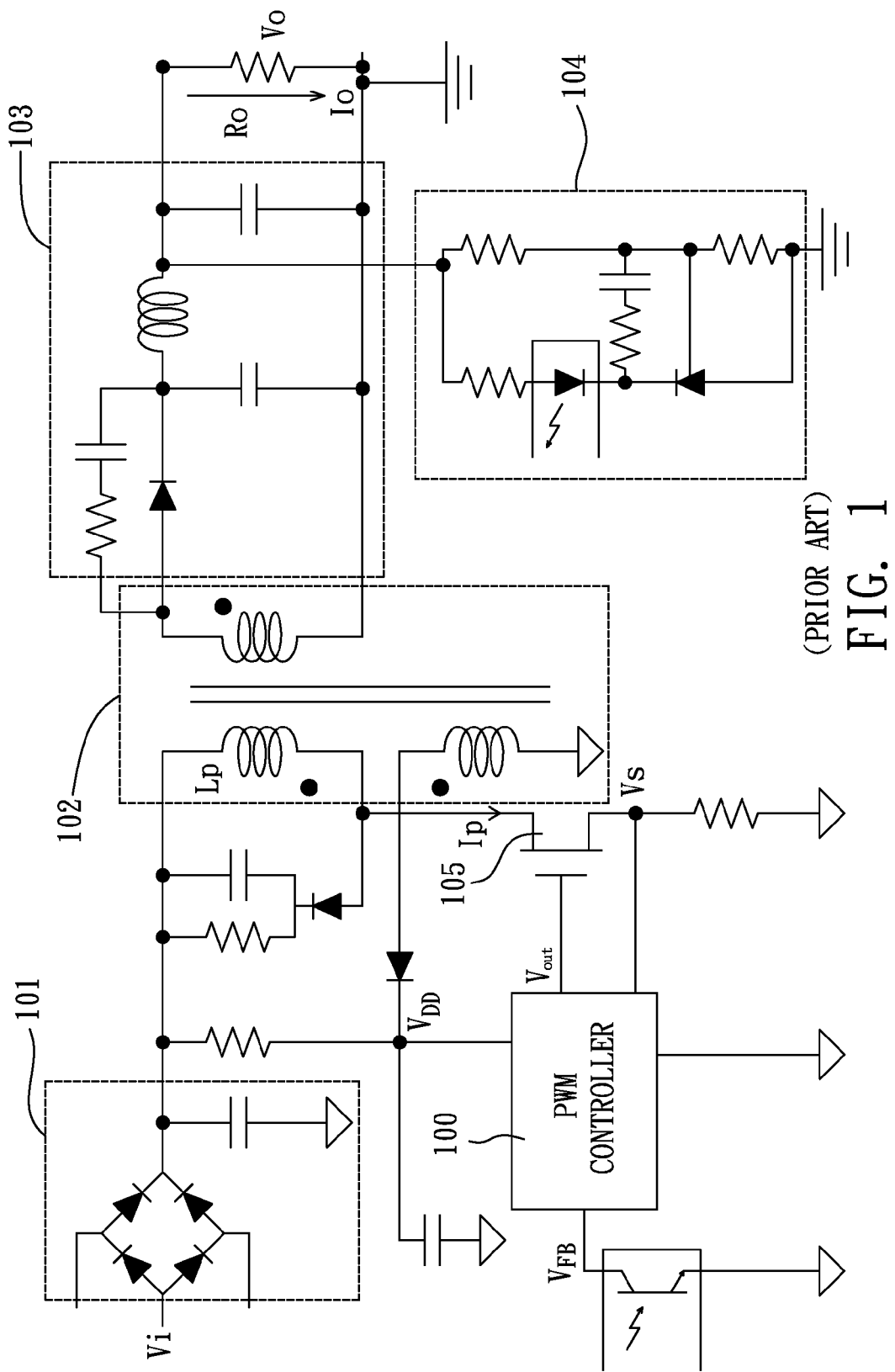
FIG. 1 is the architecture of a typical AC-to-DC power adapter.

Using the full-range-duty PWM signal generation apparatus of a preferred embodiment of the present invention as illustrated in FIG. 3 to implement the PWM controller 100 in the typical AC-to-DC power adapter as shown in FIG. 1, an AC-to-DC power adapter capable of powering down automatically is proposed. As can be seen, the present invention needs no additional component to implement the power-down function.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A full-range-duty PWM signal generation method for an AC-to-DC power conversion, comprising the steps of:
    generating a saw-tooth signal with a predetermined valley voltage;
    generating a reference signal according to at least one of a current feedback signal and a voltage feedback signal; and
    generating a PWM signal according to voltage comparison of said saw-tooth signal and said reference signal.

2. The method according to claim 1, wherein said saw-tooth signal is generated across a capacitor by connecting said capacitor with an adaptive current source and a switching pull-low circuit.

3. The method according to claim 2, wherein said adaptive current source is generated according to a conversion function of a main power input voltage, wherein said conversion function can be one selected from the group consisting of a constant, a first order polynomial, and a second order polynomial.

4. The method according to claim 2, wherein said switching pull-low circuit periodically pulls said saw-tooth signal to said predetermined valley voltage in response to a clock signal.

5. The method according to claim 4, wherein said clock signal has a mode selected from the group consisting of constant turn-on mode, constant turn-off mode, fixed-frequency mode, and free-running mode.

6. The method according to claim 1, wherein said PWM signal has zero duty cycle when the voltage of said reference signal is smaller than said predetermined valley voltage.

7. A full-range-duty PWM signal generation apparatus for an AC-to-DC power conversion, comprising:
    a saw-tooth signal generator for generating a saw-tooth signal with a predetermined valley voltage;
    a combination circuit for generating a reference signal according to at least one of a current feedback signal and a voltage feedback signal; and
    a pulse circuit for generating a PWM signal according to voltage comparison of said saw-tooth signal and said reference signal.

8. The apparatus according to claim 7, wherein said saw-tooth signal generator comprises a capacitor, an adaptive current source, and a switching pull-low circuit, wherein said saw-tooth signal is generated across a capacitor by connecting said capacitor with said adaptive current source and said switching pull-low circuit.

9. The apparatus according to claim 8, wherein said adaptive current source generates a current according to a conversion function of a main power input voltage, wherein said conversion function can be one selected from the group consisting of a constant, a first order polynomial, and a second order polynomial.

10. The apparatus according to claim 8, wherein said switching pull-low circuit comprises a switch and a voltage regulator, wherein said switch is responsive to a clock signal and in series with said voltage regulator, and said voltage regulator is used to provide said predetermined valley voltage.

11. The apparatus according to claim 10, wherein said voltage regulator can be a diode.

12. The apparatus according to claim 10, further comprising a clock generator for generating said clock signal, which has a mode selected from the group consisting of constant turn-on mode, constant turn-off mode, fixed-frequency mode, and free-running mode.

13. The apparatus according to claim 7, wherein said pulse circuit generates said PWM signal with zero duty cycle when the voltage of said reference signal is smaller than said predetermined valley voltage.

14. The apparatus according to claim 7, wherein said pulse circuit comprises a comparator with a negative input coupled to said reference signal and a positive input coupled to said saw-tooth signal.

15. The apparatus according to claim 14, wherein said pulse circuit further comprises a latch with a SET input coupled to said clock signal, a RESET input coupled to an output of said comparator, and a state output for providing said PWM signal.

16. A system using a full-range-duty PWM signal generation apparatus for an AC-to-DC power conversion, comprising:
    a power conversion unit, responsive to a PWM signal to provide the power conduction path from an AC power source to a DC power output;
    a saw-tooth signal generator for generating a saw-tooth signal with a predetermined valley voltage;
    a combination circuit for generating a reference signal according to at least one of a current feedback signal and a voltage feedback signal; and
    a pulse circuit for generating said PWM signal according to voltage comparison of said saw-tooth signal and said reference signal.

* * * * *